United States Patent [19]

Hobden et al.

[11] 3,951,303

[45] Apr. 20, 1976

[54] BEVERAGE-DISPENSING MACHINE

[75] Inventors: Nigel Mark Hobden, Leamington Spa; Barrie Mair, Maidenhead; Michael Taylor; Malcolm Douglas Norman Withnall, both of Warwick, all of England

[73] Assignee: Mars Limited, Slough, England

[22] Filed: Sept. 24, 1973

[21] Appl. No.: 399,814

[30] Foreign Application Priority Data

Sept. 20, 1972 United Kingdom............... 43619/72

[52] U.S. Cl. ................................................ 221/96
[51] Int. Cl.² .......................................... A47G 19/24
[58] Field of Search ............... 221/11, 96, 120, 121, 221/122, 297, 301, 132, 150, 222, 223

[56] References Cited
UNITED STATES PATENTS

| 969,574 | 9/1910 | Svanberg | 221/301 X |
|---|---|---|---|
| 2,639,207 | 5/1953 | Ziska | 221/297 |
| 2,726,026 | 12/1955 | Gould | 221/96 X |
| 3,247,940 | 4/1966 | Christine | 221/96 X |
| 3,283,951 | 11/1966 | Gladfelder | 221/11 |

*Primary Examiner*—Stanley H. Tollberg
*Attorney, Agent, or Firm*—Davis, Hoxie, Faithfull & Hapgood

[57] ABSTRACT

A beverage dispensing machine comprises a rotatable holder having columns for receiving stacks of cups disposed around and equidistant from the axis of rotation of the holder. Different columns of the holder receive stacks of cups containing the dry ingredients for different beverages. A selection indicating means operated by the customer controls a drive motor which rotates the holder, causing it to stop with the column containing the selected beverage in register with a cup separating device. The cup separating device is located to the side of the path of rotation of the columns and separates the lowermost cup from the stack. A transport mechanism moves the cup horizontal to a station where it is filled with hot water to make the beverage.

32 Claims, 8 Drawing Figures

BEVERAGE-DISPENSING MACHINE

The present invention relates to improvements in beverage-dispensing machines.

In a conventional beverage-dispensing machine, the dry ingredients of the beverage are dropped into a funnel-shaped mixing bowl where they are mixed with hot water. The beverage, thus formed, drains out of the funnel through a central drain spout into a cup waiting below.

A beverage-dispensing machine has been proposed which is filled with stacks of cups already containing the dry ingredients. Such a machine is known as a primed-cup beverage-dispensing machine. The cups are taken one by one from the bottom of the stack and filled with water to make a beverage. Difficulty is encountered in trying to produce such a machine which can offer a range of beverages; even as simple a range as; coffee, coffee with milk, coffee with sugar and coffee with milk and sugar. The machine either becomes very bulky because of the multiplication of parts, or some of the ingredients, such as milk and sugar, are not included in the cup but added to the cups, as required, at the same time as the hot water after the cups are separated from the stack, and thus some of the advantages of this kind of beverage dispensing machine are lost.

According to the present invention a beverage-dispensing machine comprises a holder having columns for receiving stacks of cups, a column-selecting device, and means controlled by the column selecting device for moving the holder to bring the selected column into register with a cup-separating device which is adjacent the holder and which is adapted to separate cups singly from a stack of cups in the selected column.

The selecting means preferably comprises beverage selection indicating means operable by a customer to indicate a selection from a range of beverages, the holder having columns corresponding to each beverage of the range for receiving stacks of cups containing the dry ingredients of the beverage, the selecting device controlling the moving means to bring the column corresponding to the beverage indicated by the beverage-selection indicator into register with the cup-separating device. In use, the columns contain stacks of cups, the cups of each column containing the dry ingredients for the beverage corresponding to that column. Thus only hot water has to be added to the contents of each cup to make up the required beverage.

Where there is a substantially greater demand for some beverages than others, more than one column may be fitted with cups containing the dry ingredients for those beverages. For example, a machine which has ten columns may have two columns for coffee with milk and sugar, two columns for tea with milk and sugar and one column each for, coffee, coffee with milk, coffee with sugar, tea with milk, drinking chocolate, and a savoury drink.

In the known beverage-dispensing machines the means for separating the cups from the stacks is in the form of a ring which encircles the stack. It is therefore not possible to use a single separating means for several stacks without providing a mechanism for lifting the stacks or lowering the ring whilst the separating means is being transferred from one stack to another.

According to a preferred form of the present invention the means for moving the holder is adapted to move the columns in a horizontal path and the cup-separating device is located to the side of the said horizontal path.

Furthermore in the preferred form of the present invention a delivery pipe for hot water is spaced horizontally from the cup separating device, cup transport means being movable horizontally between a first position below the cup-separating device and a second position below the delivery pipe and being adapted to carry a cup separated from a stack by the separating device from the first position to the second position. Preferably the transporter is disposed below a base plate and the holder is disposed above the base plate, the separated cups falling through a hole in the base plate and the delivery pipe passing through the base plate at a position spaced from the hole. Thus the likelihood of wetting of the cups in the stacks with steam rising from the cup in the cradle is reduced, the distance the water has to drop to the cup can be made smaller thereby avoiding splashing.

A method of dispensing beverages according to the invention comprises the steps of selecting a beverage from a range, rotating a holder carrying stacks of cups, the cups of different stacks containing the dry ingredients of different beverages, stopping rotation of the holder when the stack containing the dry ingredients of the selected beverage is at a separating station, separating the lowermost cup from the track, and adding hot water to the separated cup. Preferably the separated cup is moved horizontally from below the stack before the hot water is added. In this way the likelihood of steam wetting the contents of the primed cups in the holder is reduced.

An embodiment of the invention will now be described, by way of example, with reference to the accompanying drawings, of which.

A rotatable cup holder 10 comprises eight vanes 11 which extend radially from and are carried by an axle 12 and which define eight vertical columns in which stacks of plastic cups 13 are located. The vanes have flanges which extend circumferentially to retain the cups in the columns. These flanges are not shown in the drawings for simplicity. The axle extends through bearings (not shown) in a base plate 14 and can be rotated in step-wise manner by an eight-start Geneva drive mechanism 15 located beneath the base plate 14.

The stacks of cups 13 are supported in the columns by two rings 16 and 17 concentric with the axle 12 and mounted above the base plate 14 by means of pillars 18. The rings are broken at a cup separating station 20 which is in register with one of the columns when the Geneva drive mechanism is in a dwell position. They are spaced apart by a distance equal to the diameter of the cups 13 immediately below their rims 19 so that they support the lowermost cups by their rims in all of the columns save the column at the separating station.

The cups contain the dry ingredients for beverages, the cups in different columns of the holder 10 containing the dry ingredients of different beverages from the range offered by the machine. In the present machine there are two columns of cups containing coffee, dried milk and sugar, and one each of cups containing tea, dried milk and sugar; tea and dried milk; coffee; coffee and dried milk; coffee and sugar; and drinking chocolate.

Figure 5:
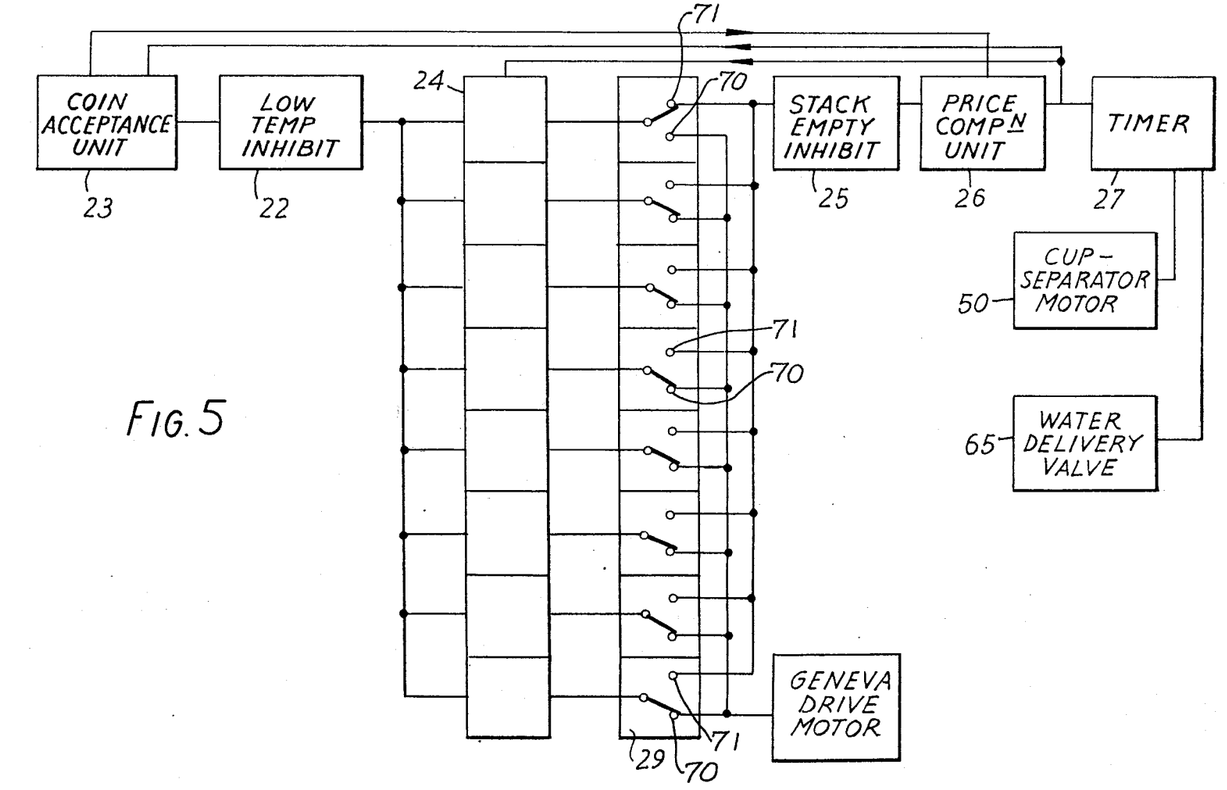
FIG. 5 shows a block diagram of the control circuit.

The control circuit for the machine is shown in FIG. 5. The customer feeds into the machine money to the value of the price of the beverage he wishes to purchase. A coin acceptance unit 23 checks, identifies and holds the coins. The coin unit then passes a signal to a button bank 24 through a low-temperature inhibit unit 22. The unit 22 senses the water temperature and, if the water is not hot enough, prevents the machine from operating by preventing the signal being passed to the button bank.

The button bank 24 consists of an array of eight push-buttons on the front of the machine-housing corresponding to the eight columns of the holder 10. Against each button is a label indicating the beverage that will be made when water is added to the contents of the cups in the corresponding columns and hence that will be dispensed when the button is pressed. When pressed, each button closes a latching switch which remains closed until it is released by an electrical impulse to a locking solenoid.

Figure 1:
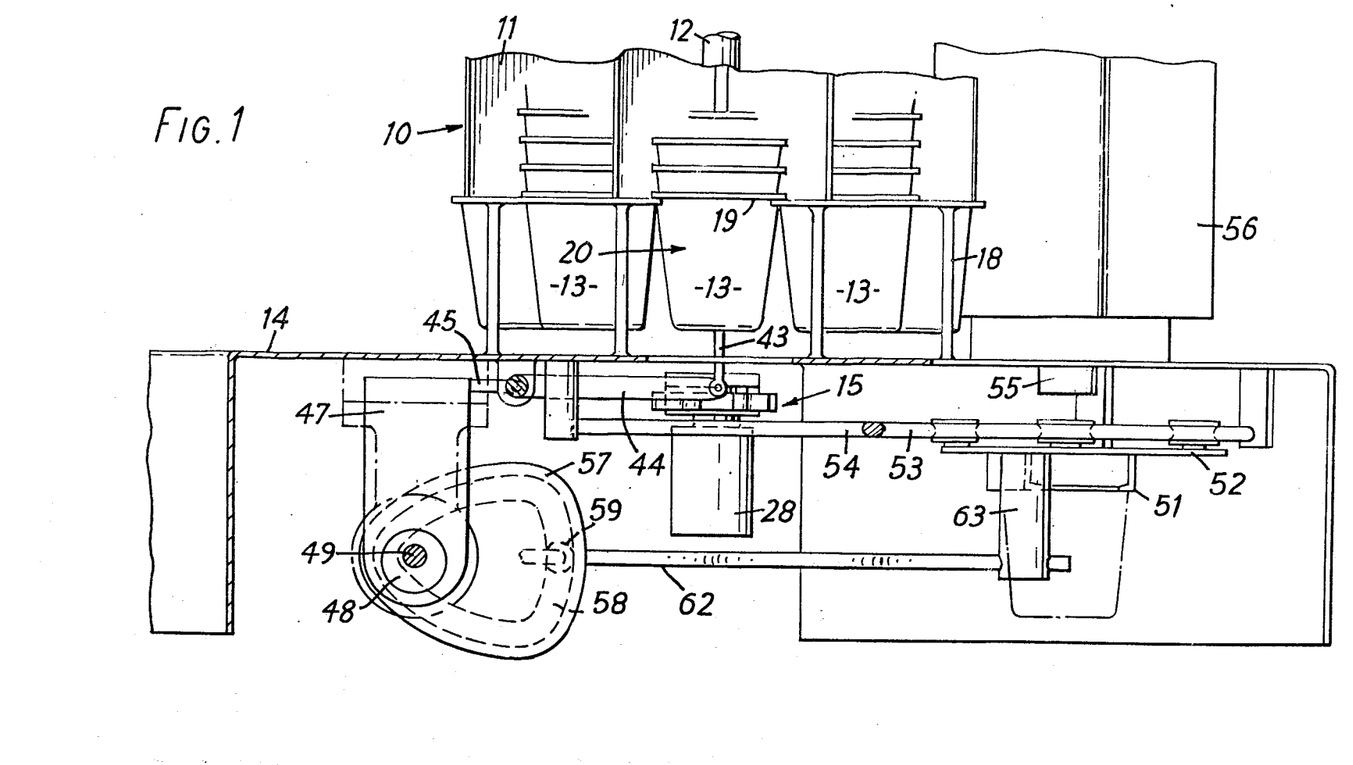
FIG. 1 is a vertical section partly in elevation and with parts omitted for clarity taken along the line I—I of FIG. 2, showing a beverage-dispensing machine.
Figure 2:
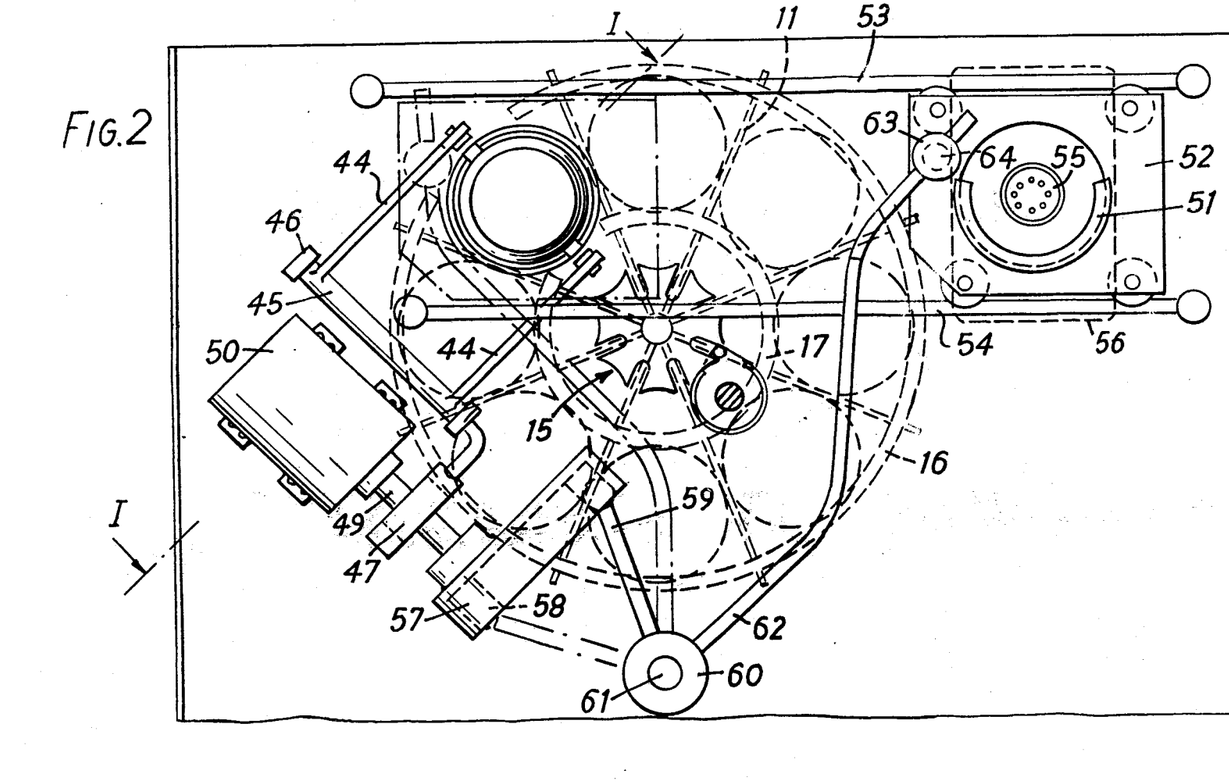
FIG. 2 shows a bottom plan view of the machine of FIG. 1.
Figure 3:
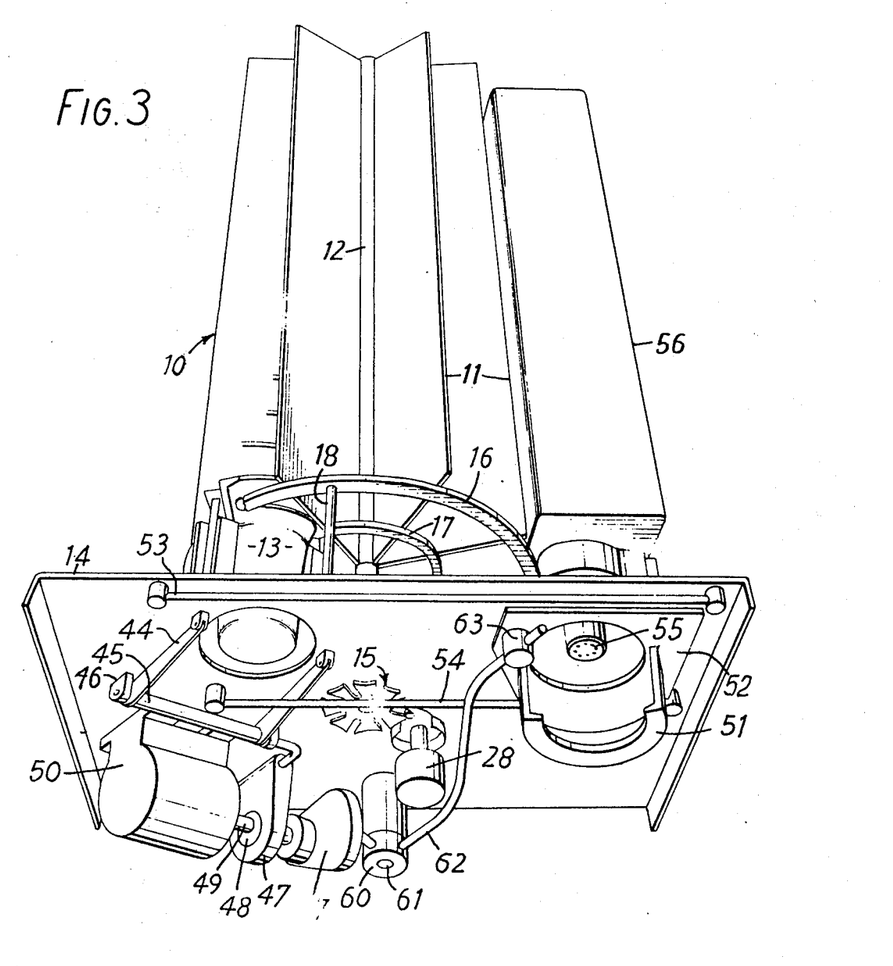
FIG. 3 shows a perspective view of the machine of FIGS. 1 and 2.

The customer presses the appropriate button to indicate his selection of beverage. A source of electric current is then connected through the switch associated with the operated push-button to a corresponding one of eight microswitches 29. The microswitches are change-over switches and are mounted in a bank on the base plate 14. They are operated by means of eight cams mounted one above the other on the axle 12. Neither the cams nor the microswitches are shown in FIGS. 1 to 3 of the drawings. The movable contacts of the microswitches are normally in the position in which they engage the first poles 70, but when the column corresponding to a microswitch is at the separating station, the associated cam moves its movable contact into the position in which it engages the second pole 71.

The first poles 70 of the microswitches are connected to the motor 28 of the Geneva drive mechanism. If the holder is not in the position in which the column corresponding to the button pressed is at the separating station, the movable contact of the corresponding microswitch will be at the first pole and the source of electric current will be connected to the motor 28 through the microswitch. The Geneva drive mechanism rotates the holder 10 in a step-wise manner until the column corresponding to the button pressed reaches the separator station. In this position the corresponding cam on the axle 12 moves the contacts of the microswitch from the first to the second pole and the current to the motor 28 is interrupted.

The second poles of the microswitch are connected through a stack-empty inhibit unit 25 to a price comparison unit 26. The unit 25 checks that there is at least one cup in the column at the separator unit and prevents the machine from functioning if there is not. In the price comparison unit 26, a signal from the coin acceptance unit representative of the total value of the coins held in the unit is compared with a signal representative of the price of the selected beverage. If the correct money has been fed into the machine, the unit 26 gives an output which opens the closed switch of the button bank, causes the acceptance unit to accept the coin or coins and starts a timer 27.

The price comparison unit is operated when the movable contact of the microswitch associated with the push-button that has been operated is at the second pole. If the column holding cups of the ingredients of the selected beverage is not at the separating station, this will occur when the holder has been rotated to bring the column to the station. If the column holding cups of the ingredients of the selected beverage is already at the station when the button is pressed, the price comparison unit 26 will be operated immediately.

The timer 27 firstly energises the motor 50 of the cup separating mechanism 50.

The cup-separating mechanism is formed in two parts, disposed on a common radius to the axis of rotation of the holder. One part is located to the inside of the column and the other is located to the outside. Each part consists of a lever 35 and a catch 36 both of which are pivoted to a post 37 mounted on the base plate 14 at the edge of a hole 38. Each lever 35 has a horizontally-extending recess 39 between two abutments 40 and 41 in its end facing the stack of cups. The free ends of the catches 36 are cranked towards the stack. Under the action of a spring (not shown), the catches 36 are biased towards the stack and the undersides of the catches rest on pegs 42 carried by the levers 35.

The levers 35 are rocked about their pivot axes by means of push rods 43 which extend through holes in the base plate. The push rods 43 are pivotally connected at their lower ends to two arms 44 extending transversely from a rocker shaft 45 which is journalled in bearing 46 on the underside of the base plate. One end of the shaft 45 is cranked and extends through a bore in a block 47. There is a circular hole in the block 47 at right angles to the bore in which a disc 48 mounted eccentrically on the drive shaft 49 of an electric motor 50 is fitted.

Rotation of the drive shaft 49 causes the disc 48 to rotate in the hole in the block 47. Owing to the eccentricity of the disc the block 47 executes an orbital movement about the drive shaft. The component of the movement parallel to the plane of the base plate is taken up by sliding of the block 47 to and fro on the cranked portion of the shaft 45; the component perpendicular to the base plate produces a rocking movement of the shaft about its axis which, through the arms 44, causes the push rods 43 to move up and down.

Figure 4A:
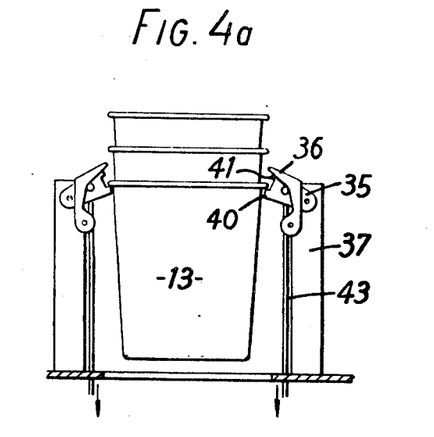
FIGS. 4a to 4d show the cup-separating mechanism in various positions.

While the holder is being rotated to bring the appropriate stack of cups to the separating station, the push rods 43 are in their uppermost position and the levers 35 are rotated up and away from the stacks of cups as shown in FIG. 4a. The catches are lifted away from the stack by means of the pegs 42. The lower abutments 40 are horizontally aligned with the rings 16 and 17 and bridge the gaps in the rings so that as the rims of the lowermost cups in the stacks slide along the rings and through the separating station they are carried across the gap by the abutments 40. The rotation of the holder stops with the lowermost cup of the selected stack of cups resting on the abutments 40.

Figure 4B:
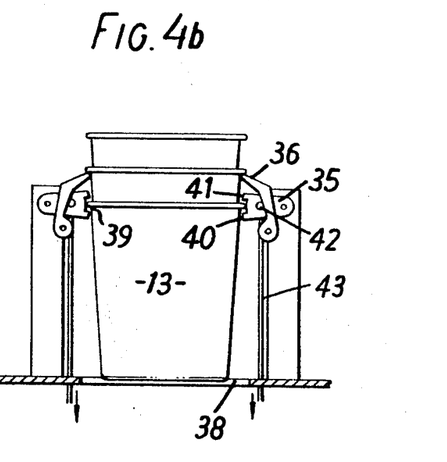
Figure 4C:
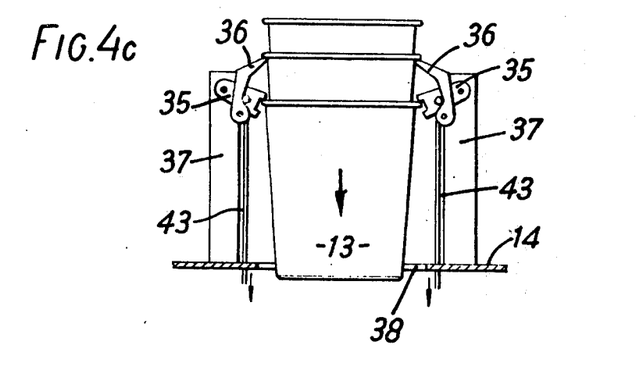

When the rotation of the holder is completed the timing motor 27 causes the motor 50 to be operated for one revolution. The first half cycle of rotation of the motor causes the push rods to be lowered and the consequent inwards and downwards movement of the levers 35 causes the stack to be lowered. The catches 36 rotate inwardly until they engage the sides of the next cup above the lowermost cup immediately below its rim (see FIG. 4b). Although the levers 35 continue to rotate downwards, the catches 36 are prevented from further rotation by stops (not shown). The weight of the stack is now borne by the catches and the abutments 40 disengaging the underside of the rim of the lowermost cup. Further rotation of the levers 35 causes the abutments 41 to press on the upper side of the rim and prise the lowermost cup away from the rest of the cups in the stack (see FIG. 4c). The separated cup falls through the hole 38 and is caught by a cradle 51 below.

Figure 4D:
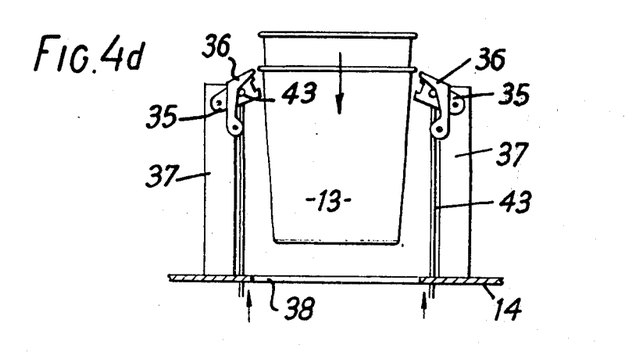

The second half cycle of rotation of the motor 50 causes the levers 35 to be rotated upwardly. When the levers reach the position shown in FIG. 4d the pegs on the levers 35 lift the catches clear of the rim on the cup which is now lowermost in the stack allowing the stack to drop until the lowermost cup is supported by its rim on the abutments 40 as shown in FIG. 4a.

The cradle 51 is supported on a carriage 52 which runs on rails 53 and 54 between two extreme positions. The first position is below the hole 38 and the second position is below the outlet nozzle 55 at the end of a delivery pipe from a hot water tank 56.

The carriage 52 is moved along the rails 53 and 54 by means of the motor 50. An eccentric disc 57 is mounted on the end of the shaft 49 and has a groove 58 formed in its end face which is disposed eccentrically of the axis of the drive shaft. The end of an arm 59 is received by the groove. The arm 59 is secured at its other end to a bush 60 rotatably mounted on a post 61. A second arm 62 is secured at one end to bush 60. Its other end passes through a bush 63 mounted on a post 64 carried by the carriage 52.

FIGS. 1, 2 and 3 shows the position of the carriage at the beginning and end of the dispensing cycle. When the cup splitter starts to operate and the levers 35 start to descend the disc 57 rotates with the disc 48. The arm 59 moves along the groove 58 and is thus swung towards the axis of rotation of the shaft 49. The swinging movement is transmitted through the bush 60 to the arm 62 which moves the carriage from below the outlet nozzle 55 to below the hole 38. The component of movement of the arm perpendicular to the direction of travel of the carriage is taken up by the arm 62 sliding in the hole in the bush 63. The carriage reaches the position below the hole 38 before the levers 35 have been moved down by an amount sufficient to prise the lowermost cup from the stack. The cup, when released falls into the cradle 51 which is C-shaped in plan to hold the cup positively. Further rotation of the shaft 48 causes the levers 35 to be rotated upwardly and moves the arm 59 away from the axis of rotation causing the arm 62 to bring the carriage to below the outlet nozzle 55 at the end of one revolution of the shaft 48.

Finally, the timer 27 causes a solenoid valve 65 in the delivery pipe to open for a predetermined time allowing a metered quantity of hot water to flow into the cup in the cradle 51. The machine then switches itself off and the cup positioned below the nozzle, is accessible to the customer and can be removed.

What is claimed is:

1. A machine for dispensing a range of beverages comprising:
   a holder comprising several compartments, each compartment being adapted to receive a stack of cups, said holder having at least one compartment corresponding to each beverage of the range;
   a cup separating station;
   compartment selecting means comprising means responsive to selection by a customer for moving the holder and said plurality of stacks of cups to present a selected compartment to the cup separating station;
   stationary means providing a common support for said plurality of stacks of cups as they are moved by the holder in presenting the selected compartment to the cup separating station;
   movable cup supporting means at said station positioned to receive cups from the stationary supporting means and to support them as they are presented to the station;
   and means at the cup separating station for removing the movable supporting means from supporting position and for separating cups singly from the stack so presented.

2. A machine as claimed in claim 1 and including stacks of cups in the compartments, the cups in each compartment containing the dry ingredients for the beverage corresponding to that compartment.

3. A machine for dispensing a range of beverages comprising:
   a holder comprising several compartments, each compartment being adapted to receive a stack of cups, said holder having at least one compartment corresponding to each beverage of a range of beverages;
   means for selecting a compartment, said selecting means comprising beverage selection indication means operable by a customer to indicate a selection from the range of beverages;
   means adjacent the holder for separating cups singly from the stack in register with the separating means,
   means controlled by the selecting means for moving the compartments relative to the separating means to bring the compartment corresponding to the selection into register with the cup-separating means;
   a plurality of switches, each of which corresponds to a different one of the compartments, the selection means being operable to connect a selected one of the switches to a source of electric current;
   and cam means carried by the holder, said cam means being adapted to operate the switches when their corresponding compartment is in register with the separating means, and wherein the holder moving means comprises a motor which is connected to the switches, operation of a switch by the cam means causing a circuit through the switch to the drive motor to be broken.

4. A machine as claimed in claim 3 wherein the selection means comprise a plurality of latching switches, each of which is electrically connected between the source of electric current and a corresponding one of the first-mentioned switches.

5. A machine as claimed in claim 4 wherein said latching switches are push button operated latching switches.

6. A machine as claimed in claim 3 including a control circuit for the cup separating means and wherein the switches are change-over switches each switch including two poles, the first pole being connected to the motor and the second pole being connected to the control circuit for the cup separating means, said switch being adapted to be moved to the second position by the cam means when the corresponding compartment is in register with the separating means and being adapted to be in the first position when the corresponding column is not in register with the separating means.

7. A machine as claimed in claim 1 wherein said holder is rotatable about an axis and wherein said compartments are arranged in a circle around the said axis.

8. A machine as claimed in claim 1 wherein the holder moving means comprise a geneva drive mechanism.

9. A machine for dispensing a range of beverages comprising:
- a holder comprising several compartments, each compartment being adapted to receive a stack of cups, said holder having at least one compartment corresponding to each beverage of a range of beverages;
- means for selecting a compartment, said selecting means comprising beverage selection indication means operable by a customer to indicate a selection from the range of beverages;
- means adjacent the holder for separating cups singly from the stack in register with the separating means,
- means controlled by the selecting means for moving the compartments relative to the separating means to bring the compartment corresponding to the selection into register with the cup-separating means;
- the moving means being adapted to move the compartments of cups in a horizontal path, and the cup separating means being located to the side of the said horizontal path.

10. A machine as claimed in claim 9 wherein the cup separating means is adapted to separate cups from the bottom of the stack.

11. A machine as claimed in claim 9 in which the cup-separating means is formed in two similar parts disposed on opposite sides of the path of the compartments with a space therebetween whereby the stacks of cups can enter and leave the separating means along the horizontal path.

12. A machine as claimed in claim 11 wherein the holder is rotatable about an axis and wherein the compartments are arranged in a circle around the said axis, the two parts of the cup separating means being disposed on a common radius from the axis.

13. A machine as claimed in claim 9 in which the cup separating means includes at least one lever, said lever having an abutment for engaging the upper side of the rim of the lowermost cup of the stack at the separating station; at least one catch positioned to be engageable with the cup next above the lowermost cup below its rim, and means for moving said lever relative to said catch alternately increasing and decreasing the spacing between the abutment and the catch.

14. A machine as claimed in claim 13 in which the lever carries a second abutment disposed below the first abutment position to be engageable with the lowermost cup below its rim.

15. A machine as claimed in claim 9 wherein the cup separating means comprise:
- a catch;
- a pivoted lever with one end facing the stack of cups, said end having a recess and two abutments located respectively above and below the recess;
- drive means for pivoting said lever between three positions;
- a normal upper position in which the upper abutment is clear of the stack of cups and the lower abutment engages the lowermost cup below its rim, an intermediate position in which the upper abutment engages the upper side of the rim of the cup, and a lower position in which the upper abutment prises the lowermost cup free of the stack and the lower abutment is clear of the rim of the lowermost cup, the catch being clear of the stack when the lever is in the upper position and engaging the cup next above the lowermost cup below its rim when the lever is in the intermediate and lower positions.

16. A machine as claimed in claim 15 wherein the catch is pivoted and carries a stop, and including a stop on the lever which engages the stop on the catch in the upper position to hold the catch clear of the stack.

17. A machine for dispensing beverages comprising:
- selection indicating means operable by a customer to indicate his selection of a beverage from a predetermined range of beverages;
- a rotatable holder comprising several compartments disposed around and equidistant from its axis of rotation;
- stacks of cups in the compartments, the cups in the stacks of different compartments containing the dry ingredients of different beverages of said range;
- a cup separating device;
- drive means for rotating the said holder on operation of the selection indicating means to bring the compartment containing the cups with the dry ingredients of the selected beverage into register with the cup separating device, the said cup separating device being adapted to separate cups singly from the said stack.

18. A method of dispensing a selected beverage from stacks of cups, each stack containing the dry ingredients of one of a range of beverages, which comprises;
- supporting said stacks of cups on a common stationary supporting surface;
- selecting a desired beverage from the range and responsive to such selecting moving a stack of cups containing the dry ingredients of the selected beverage from a rest position over said stationary supporting surface to a cup separating station;
- transferring the selected stack from said stationary supporting surface to a movable support at said station disposed in supporting engagement with the lowermost cup of the stack; and
- withdrawing said movable support and removing it from engagement with the lowermost cup, thereby discharging the same, while retaining the remaining cups of the stack.

19. A method as claimed in claim 18 including the step of moving the cup horizontally from below the stack before the hot water is added.

20. A machine as claimed in claim 11 wherein each part of said separating means comprises:
- first means for engaging the upper side of the rim of the lowermost cup;
- second means for engaging the cup immediately above the lowermost cup below its rim; and
- means for moving the two engaging means relative to one another alternately to increase and decrease the spacing between the two said engaging means.

21. A machine as claimed in claim 1, adapted for use with cups having rims, wherein the stationary means comprise two spaced apart horizontal rails adapted to support the cups below their rims.

22. A machine as claimed in claim 21 wherein the rails are in the form of concentric rings, the rings being broken at said station to provide gaps in which the movable cup supporting means is located.

23. A machine as claimed in claim 21 wherein the movable cup supporting means is formed in two parts, each part being aligned with one of the two rails.

24. A machine as claimed in claim 1, adapted for use with cups having rims, wherein the movable cup supporting means comprises levers each having a support abutment for supporting the cup by engagement therewith below its rim, each lever being pivoted to rotate between a support position and a position in which its support is removed, the means for removing the movable support means comprising means for rotating the lever about its pivot.

25. A machine as claimed in claim 24 further comprising a plurality of catches, each catch being disposed above one of the levers, each lever including a second abutment located above the said support abutment, the removing means being operable to pivot said lever between three positions: an upper position in which the support abutment engages the lowermost cup of a stack below its rim and the second abutment is withdrawn from engagement with the cups, an intermediate position in which the second abutment engages the upper side of the rim of the lowermost cup, and a lower position in which the support of the support abutment is removed and the second abutment prises the lowermost cup free of the stack, each of the catches being pivotally mounted to move from a retracted position out of engagement with the cups when the lever is in said upper position to a position in engagement with the cup next above the lowermost cup below its rim to support it and the cups in the stack above it when the lever is in the intermediate and lower positions.

26. A machine as claimed in claim 1, adapted for use with cups having rims, further including means for engaging the underside of the rim of the cup next above the lowermost cup of a stack, means for engaging the upper side of the rim of the lowermost cup, and means for moving the two engaging means relative to one another to increase the spacing between the two said engaging means to prise the cups apart.

27. A machine as claimed in claim 26 wherein the means for engaging the upper side of the rim of the lowermost cup is fixed relative to the movable cup supporting means and the means for moving the two engaging means relative to one another comprise the means for removing the movable cup supporting means.

28. A machine as claimed in claim 27 including a pivoted lever having a free end and a recess therein and abutments on either side of the recess which engage respectively the upper and lower sides of the rim of the lowermost cup, the upper abutment constituting the second said engaging means and the lower abutment constituting the movable cup supporting means.

29. A machine as claimed in claim 28 wherein the first engaging means comprise a pivoted catch.

30. A machine as claimed in claim 29 including biasing means adapted to urge the catch towards the stack of cups.

31. A machine as claimed in claim 30 wherein the means for moving the two engaging means relative to one another comprise a linkage for rotating the lever independently of the catch.

32. A machine as claimed in claim 31 including a stop on the lever adapted to engage the catch and rotate it away from the stack of cups at one extreme of the rotational movement of the lever.

* * * * *

UNITED STATES PATENT OFFICE
CERTIFICATE OF CORRECTION

PATENT NO. : 3,951,303
DATED : April 20, 1976
INVENTOR(S) : Nigel Mark Hobden, Barrie Mair, Michael Taylor, Malcolm Douglas, Norman Withnall It is certified that error appears in the above-identified patent and that said Letters Patent are hereby corrected as shown below:

Column 7, line 4, "column" should be --compartment--.

Signed and Sealed this

Eighth Day of March 1977

[SEAL]

Attest:

RUTH C. MASON
*Attesting Officer*

C. MARSHALL DANN
*Commissioner of Patents and Trademarks*